US011886227B1

(12) United States Patent
Gupta

(10) Patent No.: US 11,886,227 B1
(45) Date of Patent: Jan. 30, 2024

(54) VIRTUAL-REALITY ARTIFICIAL-INTELLIGENCE MULTI-USER DISTRIBUTED REAL-TIME TEST ENVIRONMENT

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 30 days.

(21) Appl. No.: 17/863,667

(22) Filed: Jul. 13, 2022

(51) Int. Cl.
*G06F 11/36* (2006.01)
*G06N 20/00* (2019.01)
*G06F 18/21* (2023.01)

(52) U.S. Cl.
CPC ...... *G06F 11/3688* (2013.01); *G06F 11/3684* (2013.01); *G06F 18/2185* (2023.01); *G06N 20/00* (2019.01)

(58) Field of Classification Search
CPC ............. G06F 11/3684; G06F 11/3688; G06F 18/2185; G06N 20/00
See application file for complete search history.

(56) References Cited

U.S. PATENT DOCUMENTS

| 9,104,814 B1 * | 8/2015 | Mompoint | G06F 11/3668 |
| 11,216,358 B2 * | 1/2022 | Mayhew | G06F 11/3089 |
| 11,640,352 B2 * | 5/2023 | Moondhra | G06F 11/3684 |
| | | | 717/124 |
| 2012/0122570 A1 * | 5/2012 | Baronoff | A63F 13/792 |
| | | | 463/31 |
| 2012/0124559 A1 * | 5/2012 | Kondur | G06F 8/41 |
| | | | 717/125 |

(Continued)

FOREIGN PATENT DOCUMENTS

| CN | 105677013 B | 10/2018 |
| CN | 108351691 B | 2/2022 |
| RU | 2665901 C1 | 9/2018 |

OTHER PUBLICATIONS

Alpala et al., Smart Factory Using Virtual Reality and Online Multi-User: Toward a Metaverse for Experimental Frameworks, Jun. 20, 2022 (Year: 2022).*

*Primary Examiner* — Douglas M Slachta
(74) *Attorney, Agent, or Firm* — Banner & Witcoff, Ltd.

(57) ABSTRACT

A virtual-reality process for user(s) to perform software testing is disclosed. A processor executing an engine may generate virtual-reality interface(s) into a metaverse and a first virtual-reality avatar in the metaverse for said first user. The processor may execute the engine to perform the software testing. The engine may load the test software. Start and end points may be input in order to identify a range in the test software to be tested. The engine—using recursive artificial intelligence—can navigate and test the test software from the start to the end. The engine utilizing the recursive artificial intelligence can input random test data into the test software and imperceptibly generate a tree of all navigational points and relationships in the test software from the start to the end. User(s) may interface with the virtual-reality interface(s) in test software instance(s) during processing. The tree may be stored and displayed.

20 Claims, 7 Drawing Sheets

(56) References Cited

U.S. PATENT DOCUMENTS

| | | | |
|---|---|---|---|
| 2013/0005415 A1* | 1/2013 | Thomas | A63F 13/42 |
| | | | 463/10 |
| 2015/0169433 A1* | 6/2015 | Bryl | G06F 11/3684 |
| | | | 714/38.1 |
| 2015/0235434 A1* | 8/2015 | Miller | G02B 27/017 |
| | | | 345/633 |
| 2016/0210722 A1* | 7/2016 | Fortin | A63F 13/30 |
| 2020/0401214 A1* | 12/2020 | Orr | G06T 11/00 |
| 2021/0366183 A1* | 11/2021 | Gisslén | G06N 20/00 |
| 2022/0100647 A1* | 3/2022 | Hamid | G06F 11/3684 |

* cited by examiner

Sample System Architecture

VIRTUAL-REALITY ARTIFICIAL-INTELLIGENCE MULTI-USER DISTRIBUTED REAL-TIME TEST ENVIRONMENT

TECHNICAL FIELD OF DISCLOSURE

The present disclosure relates to processes and machines for data processing utilizing artificial intelligence and to a knowledge processing system and methodology that comprises specific domain data that is integrated as a collection of facts and relationships (i.e., knowledge representation) and that applies various reasoning techniques to provide a virtual-reality and artificial-intelligence based, multi-user, distributed, real-time, test environment for software, applications, systems, web sites, plug-ins, and/or anything under development or requiring maintenance.

BACKGROUND

Software, applications, systems, web sites, plug-ins, and/or anything under development or requiring testing, validation, maintenance etc. ("test software") must be tested and/or otherwise vetted to confirm correct operation and ensure that there are no errors or bugs before being commercially released or otherwise reliably used.

Traditionally, developers have assessed the functionality and efficient operation of test software by using manual test mechanisms. This is extremely cumbersome, requires a great deal of effort, and is prone to error. It also requires developers to invest significant time in developing the test mechanisms to be used as well as to generate the sample data utilized with the test software.

Even various commercially available tools for attempting to perform automated testing, such as Tosca and Selenium, suffer from the same problems and still depend upon engineers to manually write test scenarios and configure them in automated testing tools. Hence, a significant amount of manual effort is still required. This is because a tester will still need to manually provide the links, the configuration points, the test data, and/or other information for the tool to be able to operate.

The foregoing approaches are always prone to failures in case of any application flow, configuration, test data changes, or the like.

Further, such traditional approaches towards testing are often bottlenecked because only a single developer can test the test software at one time. Stated differently, prior art mechanisms do not enable efficient simultaneous testing by multiple users.

These problems underscore the need for a technological solution to obviate the need for an individual engineer to manually write test scenarios or manually configure automated test tools for test software. This would save a great deal of time and effort. It will also reduce the complexity of the testing process. And it will decrease application deployment and availability time drastically.

SUMMARY

In accordance with one or more arrangements of the disclosures contained herein, solution(s) are provided to address one or more of the shortcomings with respect to test software by, for example, (a) providing a virtual-reality (VR) based test environment and/or VR/metaverse with little to no manual intervention, (b) enabling developer(s) to control VR/metaverse user(s) and change testing directions on demand, (c) allowing application testing paths and traffic to be controlled by VR/metaverse users, (d) enabling one or more users to perform testing simultaneously and in real time, (e) automatically scanning and assessing all the navigational points in testing software, (f) creating parent child relationship(s)/tree(s) of all navigation points, which can be saved for future reference, (g) providing an artificial-intelligence-based update of navigation paths when appropriate, and (h) enabling automatic testing of the test software by merely providing a start point (e.g., start URL) and end point (e.g., end URL) such that the automatic testing can do everything in between those two points. Hence, in some embodiments, no other manual information, no test data, no configuration points, intervening URLs, etc. must be provided. Ideally, little to no manual effort should be required with various implementations described in this disclosure.

As used in the context of this disclosure, virtual reality refers a simulated experience that can be comparable to or wholly distinct from the real world. Augmented reality and mixed reality, sometimes known as extended reality or XR, are two further sorts of VR-style technologies within the scope of the inventions disclosed herein. Virtual reality systems provide realistic visuals, sounds, and other sensations that imitate a user's (or avatar's) physical presence in a virtual environment using virtual reality headsets or multi-projected environments. A person using virtual-reality gear can see around the virtual world, move around in it, and interact with virtual features or objects, or in this case test software or the like. VR headsets with a small screen in front of the eyes are typically used to get this effect, but it can also be achieved in specially constructed rooms with several large screens. Virtual reality normally includes audio and video feedback, but haptic technology may also enable additional types of sensory and force feedback. All are within the spirit and scope of the inventions in this disclosure and are collectively referred generically herein as "virtual reality" or "VR."

As used in the context of this disclosure, a metaverse is one or more networks of 3D virtual worlds that can be focused on application development and testing, as well as traditional social connections and engineers/developers working together within an operating environment to perform testing, development, and troubleshooting. A metaverse can include virtual reality—characterized by persistent virtual worlds that continue to exist even when a person is not present in or using the environment—as well as augmented reality that combines aspects of the digital and physical worlds. However, it does not require that those spaces be exclusively accessed via VR or AR. Other physical consoles and equipment may be alternatively used if desired. All are within the spirit and scope of the inventions in this disclosure and is generally referred herein collectively as a metaverse.

In view of the foregoing, instead of cumbersome and ineffective prior-art testing mechanisms, various aspects of this disclosure provide a VR-based multi-user distributed real-time test environment that will follow a parallel imperceptible execution mechanism, and will enable user(s) in a virtual reality or VR/metaverse to access, test, and assess the test software in a VR/metaverse itself.

This technology will enable a VR/metaverse instance with virtual user(s) to automatically scan and assess all the navigational points in test software, create a parent child relationship(s)/tree(s) of all navigation points and save them for future reference. This inventive "slither engine" (or "engine") would not require any manual intervention to capture these navigation points. It can be implemented as a plug-in on a browser, used as a mobile app, used as a standalone application, etc. and can itself assess all navigation points.

In case of any changes to the test software, the engine can assess periodically and can automatically update the navigation tree(s). This engine will maintain navigational info for some or all of the complete test software, eliminating the need for an engineer to manually define navigation points and test scenarios for manual or automated assessment.

This engine will be able to integrate with any test automation tool and will be able to provide a next set of navigation points based upon the target state.

For user input data on the test software, this engine will be equipped to learn about the data from past inputs or available test data tools.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a virtual-reality process for a first user to perform software testing can comprise the steps of: generating, by a processor executing an engine, a first virtual-reality interface into a metaverse and a first virtual-reality avatar in the metaverse for said first user; executing, by the processor, the engine to perform the software testing; loading, in the metaverse by the engine, test software to be tested; inputting, into the engine, a start point and an end point to identify a range in the test software to be tested; navigating and testing, by the engine using recursive artificial intelligence, the test software from the start point to the end point; inputting, by the engine utilizing the recursive artificial intelligence, random test data into the test software; generating, imperceptibly by the engine utilizing the recursive artificial intelligence, a tree of all navigational points and relationships in the test software from the start point to the end point; interfacing, by said first user using the first virtual-reality interface, a first instance of the test software during processing by the recursive artificial intelligence; storing, by the engine in memory, the tree; and displaying, by the engine in the virtual-reality interface, the tree.

In some arrangements, multiple users can simultaneously participate in the virtual-reality process through their own virtual-reality interfaces, avatars, and test-software instances.

In some arrangements, the start point and the end point for the testing process may be manually entered. Alternatively, it can be loaded from memory or can be provided by a test input tool.

In some arrangements, various aspects of the disclosure can utilize artificial intelligence and/or machine learning (including recursive processing). Such artificial intelligence may include Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, and Hierarchical Clustering. Machine learning may be supervised machine learning, semi-supervised machine learning, unsupervised machine learning, and/or utilize natural language processing. Recursive processing and natural language processing may be used as well and are referenced interchangeably herein as artificial intelligence, machine learning, and the like.

In some arrangements, one or more types of artificial intelligence can be used to periodically assess whether further processing is required and/or whether tree(s) need to be updated.

In some arrangements, the tree may identify all parent-child relationships in the test software and all links from parent to child pages.

In some arrangements, a virtual-reality process for a plurality of users to perform software testing without manual intervention can comprise the steps of: generating, by a processor executing an engine, virtual-reality interfaces into a metaverse and virtual-reality avatars in the metaverse for said plurality of users; executing, by the processor, the engine to perform the software testing; loading, in the metaverse by the engine, test software to be tested; inputting, into the engine, a start point and an end point to identify a range in the test software to be tested; navigating and testing, by the engine using recursive artificial intelligence, the test software from the start point to the end point; inputting, by the engine utilizing the recursive artificial intelligence, random test data into the test software from a test data interface or a test automation tool; generating, imperceptibly by the engine utilizing the recursive artificial intelligence, a tree of all navigational points and relationships in the test software from the start point to the end point; assessing, periodically by the recursive artificial intelligence, whether the tree needs to be updated; interfacing, by said plurality of users using virtual-reality interfaces, instances of the test software during processing by the recursive artificial intelligence; storing, by the engine in memory, the tree; and displaying, by the engine in the virtual-reality interfaces, the tree.

In some arrangements, a virtual-reality process for a plurality of users to perform software testing without manual intervention can comprise the steps of: generating, by a processor executing an engine, virtual-reality interfaces into a metaverse and virtual-reality avatars in the metaverse for said plurality of users; executing, by the processor, the engine to perform the software testing; loading, in the metaverse by the engine, test software to be tested; inputting, into the engine, a start point and an end point to identify a range in the test software to be tested; navigating and testing, by the engine using recursive artificial intelligence, the test software from the start point to the end point, said recursive artificial intelligence selected from the group consisting of: Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, Hierarchical Clustering, supervised machine learning, semi-supervised machine learning, unsupervised machine learning, and natural language processing; inputting, by the engine utilizing the recursive artificial intelligence, random test data into the test software from a test data interface or a test automation tool; generating, imperceptibly by the engine utilizing the recursive artificial intelligence, a tree of all navigational points and relationships in the test software from the start point to the end point; assessing, periodically by the recursive artificial intelligence, whether the tree needs to be updated; interfacing, by said plurality of users using virtual-reality interfaces, instances of the test software during processing by the recursive artificial intelligence; storing, by the engine in memory, the tree; and displaying, by the engine in the virtual-reality interfaces, the tree.

In some arrangements, one or more various steps, processes, and/or functions can be implemented, in whole or in part, in conjunction with machine(s) having computer-executable instructions stored on one or more local or distributed computer-readable media potentially along with various data that are executed by one or more application integrated circuits (ASICs), processors, or the like that are communicatively coupled with various machine(s) and device(s) by any type of suitable wired and/or wireless protocol(s), network(s) (e.g., local, wide area, ultrawideband, etc.), communication busses, etc. such as generally depicted, as merely one example, in FIG. 1. A skilled artisan will readily appreciate that this disclosure is extremely broad in this regard and is not in any way limited to the example of FIG. 1.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION OF THE DISCLOSURE

Figure 1:
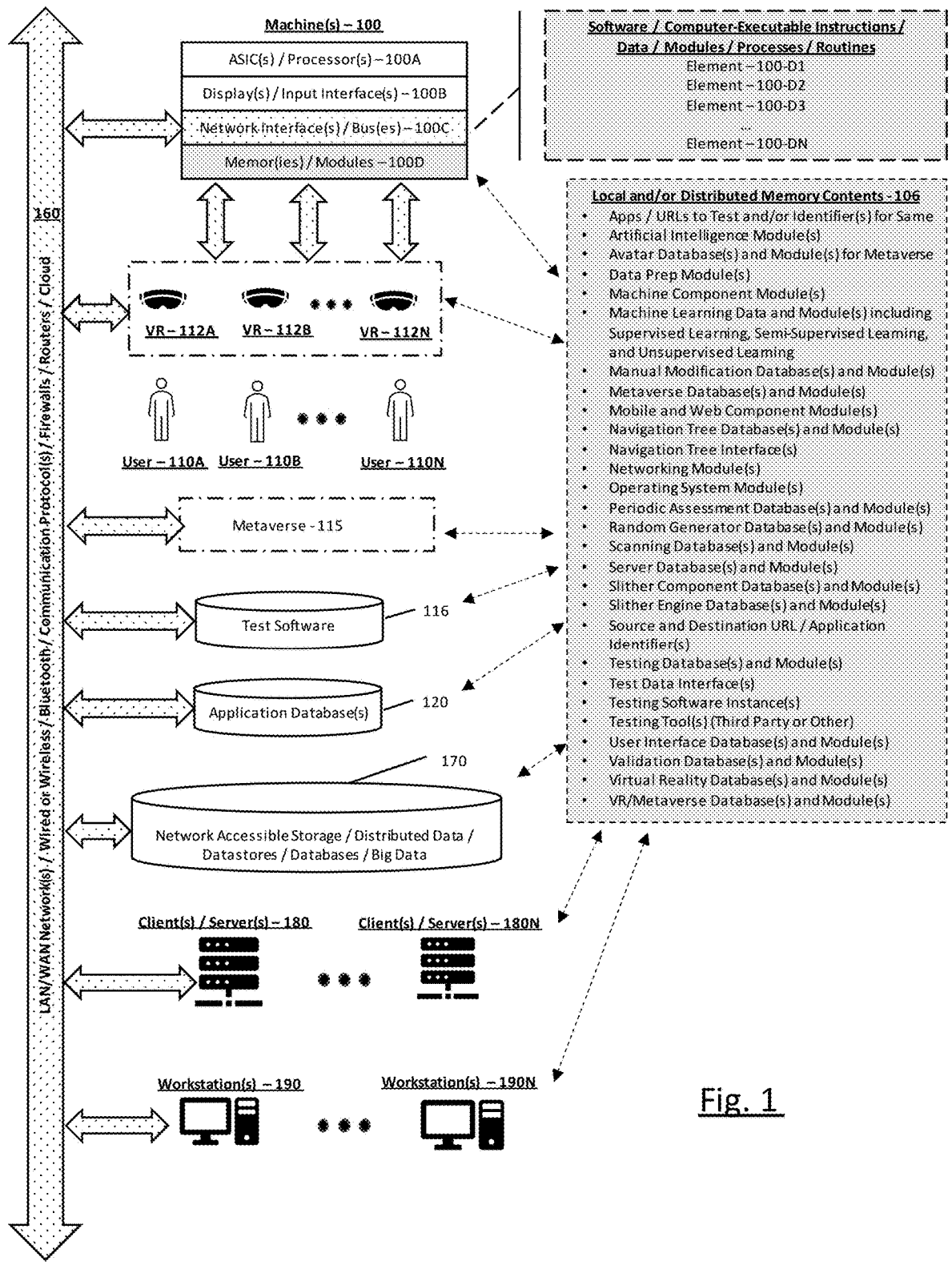
FIG. 1 depicts exemplary operating environment(s) and functionality to implement one or more aspects of this disclosure to provide improvements in a knowledge processing system and methodology that comprises specific business and subscriber domain data that is integrated as a collection of facts and relationships (i.e., knowledge representation) and that uses virtual-reality and multi-user navigation in conjunction with reasoning techniques, artificial intelligence, machine learning, and/or other processing as part of a slither engine or other engine to test, evaluate, troubleshoot, etc. the test software.

FIG. 1 depicts exemplary operating environment(s) and functionality to implement one or more aspects of this disclosure to provide improvements in a knowledge processing system and methodology that comprises specific business and subscriber domain data that is integrated as a collection of facts and relationships (i.e., knowledge representation) and that uses virtual-reality and multi-user navigation in conjunction with reasoning techniques, artificial intelligence, machine learning, and/or other processing as part of a slither engine or other engine to test, evaluate, troubleshoot, etc. the test software.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (e.g., 100, 180 . . . 180N, 190 . . . 190N etc.) can include one or more general-purpose, customized, configured, special-purpose, virtual, physical, and/or network-accessible devices such as: administrative computers, artificial intelligence systems, clients, clusters, compliance watchers, computing devices, computing platforms, controlled computers, controlled computers, controlling computers, desktop computers, distributed systems, enterprise computers, instances, laptop devices, machine learning systems, monitors or monitoring systems, nodes, notebook computers, personal computers, portable electronic devices, servers, smart devices, streaming servers, tablets, and/or workstations, which may have one or more ASICs, microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A), display(s) and/or input interfaces/devices (e.g., 100B), network interfaces, communication buses, or the like (e.g., 100C), and memories or the like (e.g., 100D), which can include various sectors, locations, structures, or other electrical elements or components (for brevity these are not separately shown for other elements depicted in FIG. 1). Other specific or general components, machines, or the like are not depicted in the interest of brevity and would be understood readily by a person of skill in the art. One or more sample(s) of the foregoing, some of which are expressly depicted, can be seen in FIG. 1 along with their associated components, subcomponents, related elements, sub-elements, etc.

As used throughout this disclosure, slither engines (or other engines), testing software, or test software (as well as software in general) can include computer-executable instructions, data, modules, processes, routines, or the like can include one or more: active-learning, algorithms, alerts, applications, application program interfaces (APIs), artificial intelligence, attachments, big data, browsers, cryptography, cryptographic hashes, daemons, databases, datasets, drivers, data structures, emails, encryptions, file systems or distributed file systems, firmware, governance rules, graphical user interfaces, hashes, images, instructions, machine learning (including supervised learning, semi-supervised learning, reinforcement learning, unsupervised learning, and/or natural language processing), metaverses, middleware, modules, objects, operating systems, platforms, plug-ins, processes, protocols, programs, routines, scripts, tools, utilities, etc.

In the context of this disclosure, artificial intelligence deals with imparting the decisive ability and thinking ability to the testing-software system and components thereof. It is a blend of computer science, data analytics, and computer-implemented mathematics, and can include classification algorithms (e.g., Naive Bayes, Decision Tree, Random Forest, Support Vector Machines, K Nearest Neighbors, etc.), regression algorithms (e.g., Linear Regression, Lasso Regression, Logistic Regression, Multivariate Regression, Multiple Regression, etc.), clustering algorithms (e.g., K-Means Clustering, Fuzzy C-mean, Expectation-Maximisation, Hierarchical Clustering, etc.), etc. Machine learning in the context of this disclosure is closely related and may be considered in some instances to overlap with artificial intelligence wholly or partially. In the context of this disclosure, machine learning can be supervised, semi-supervised, reinforcement, and/or unsupervised learning. Sample algorithms can include bidirectional LSTM, Logistic Regression, XG Boost, Random Forest, etc. Natural language and recursive processing may also be utilized if desired.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Examples can be seen in FIG. 1 as memor(ies)/module(s) 100D along with samples of the foregoing generically represented, in one instance for illustrative purposes, as any number of components, modules or the like such as element—100-D1, element—100-D2, element—100-D3, . . . element—100-DN in one or more sectors, locations, components, etc. Some or all the foregoing may additionally and/or alternatively be stored similarly and/or in a distributed manner in test software 116, application database(s) 120 and/or network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Apps/URLs to Test and/or Identifier(s) for Same, Artificial Intelligence Module(s), Avatar Database(s) and Module(s) for Metaverse, Data Prep Module(s), Machine Component Module(s), Machine Learning Data and Module(s) including Supervised Learning, Semi-Supervised Learning, and Unsupervised Learning, Manual Modification Database(s) and Module(s), Metaverse Database(s) and Module(s), Mobile and Web Component Module(s), Navigation Tree Database(s) and Module(s), Navigation Tree Interface(s), Networking Module(s), Operating System Module(s), Periodic Assessment Database(s) and Module(s), Random Generator Database(s) and Module(s), Scanning Database(s) and Module(s), Server Database(s) and Module(s), Slither Component Database(s) and Module(s), Slither Engine Database(s) and Module(s), Source and Destination URL/Application Identifier(s), Testing Database(s) and Module(s), Test Data Interface(s), Testing Software Instance(s), Testing Tool(s) (Third Party or Other), User Interface Database(s) and Module(s), Validation Database(s) and Module(s), Virtual Reality Database(s) and Module(s), VR/Metaverse Database(s) and Module(s), and other related components, executables, data, modules, etc.

The foregoing software, computer-executable instructions, data, modules, processes, routines, or the like, when executed-individually and/or collectively across-one or more various computers, machines, or the like (or any components therein) may cause ASICs, processor(s), core(s), executor(s), etc. to perform one or more artificial intelligence, machine learning and/or other above-referenced functions relevant to slither engine processing and/or may store or otherwise maintain information that may be used in one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode networks, virtual private networks (VPN), Bluetooth, ultrawideband (UWB), various protocol(s), or any direct or indirect combinations of the same. Networks also include associated equipment and components such as access points, adapters, buses, Bluetooth adapters, ethernet adaptors (physical and wireless), firewalls, hubs, modems, routers, and/or switches UWB adapters, located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based or other suitable protocol. One or more sample(s) of the foregoing, some of which are expressly depicted, can be seen in FIG. 1 along with their associated components, subcomponents, related elements, sub-elements, etc.

Multiple users 110A, 110B . . . 110N can respectively utilize virtual-reality equipment and/or headsets VR-112A, VR-112B . . . VR-112N to access a metaverse 115 or other operating environment to access test software 116. This may be accomplished through VR coupled to mobile devices (not shown) or other machines 100. This allows the users to interact with the test software, navigate links within the software, utilize testing data, implement artificial intelligence testing, generate navigational trees and/or identify navigational points, as well as perform other testing, development, troubleshooting, and related functions. Each user can interact simultaneously with other users in the metaverse to perform this functionality through the user's own personal avatar and/or testing interface.

Accordingly, and as described briefly above, a skilled artisan will understand that FIG. 1 depicts exemplary operating environment(s) and functionality to implement one or more aspects of this disclosure to provide improvements in a knowledge processing system and methodology that comprises specific business and subscriber domain data that is integrated as a collection of facts and relationships (i.e., knowledge representation) and that applies various reasoning techniques, artificial intelligence, machine learning, and/or other processing by the slither engine (or other engine) to facilitate validation, evaluation, troubleshooting, etc. of the test software.

Figure 2:
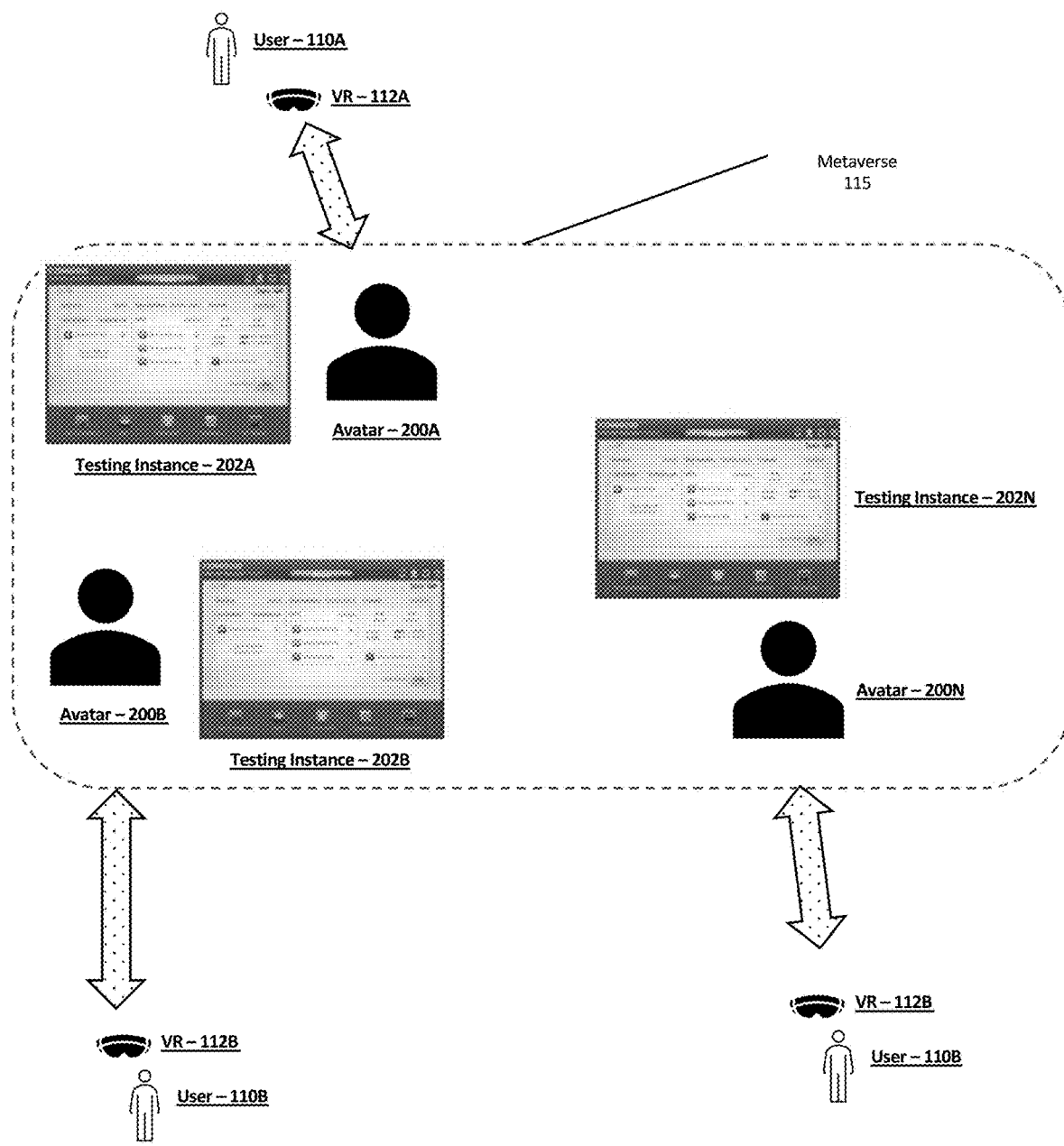
FIG. 2 is a sample high-level overview of a sample metaverse with individuals using avatars accessing testing instances in which various aspects of this disclosure can be implemented.

FIG. 2 is a sample high-level overview of a sample metaverse 115 with individuals 110A, 110B . . . 110N respectively using avatars 200A, 200B . . . 200N in which various aspects of this disclosure can be implemented. Any type of existing or custom metaverse or virtual reality environment can be utilized. Within one or more of these environments, each user/avatar can respectively interface with, view, control, etc. its own testing instance 202A, 202B . . . 202N of the test software under development or validation by using their corresponding VR gear 112A, 112B . . . 112N or the like. In the testing instances, users can view any aspect of the test software, traverse any links identified in the test software, manually direct or redirect or interrupt application and/or test software flow, or otherwise interact using the testing interfaces. This also enables multiple users to simultaneously access or test the same test software. Ideally, the slither engine process is simply initiated by identifying the starting point and the ending point for the test software and all links and navigational points can be invisibly or imperceptibly identified to build out navigational tree(s) and/or identify parent/child relationship(s) to facilitate testing, validation, further analysis, troubleshooting, etc.

And the slither engine (or other engine) does not need to figure out the test data. It is intelligent enough to identify any required test data by itself. For example, if a name field, social security number field, or any other field needs to be populated to facilitate processing of the test software, based upon the artificial intelligence it will be capable of identifying the test data, insert it itself and then proceeding with the testing. In some cases, if the test data fails, the engine can integrate with real time platforms to identify and apply a solution to resolve the failure. If there is a credit card number that is to be entered, the engine can go to its own repositories and check if it is a visa card, what should the credit card number look like, and then will provide the required input in the required format. Also, the engine is intelligent to capture and learn from test data provided by prior user inputs. It can then be stored in one or more repositories for future reference.

As depicted in FIG. 2, the three users are actually testing the same application in the virtual environment. They may be just sitting there and observing how the testing software is being automatically analyzed and tested. Another factor is that the users can influence the testing. If the engine is testing the particular flow of the test application, and a user wants something else to be tested, then using their virtual reality avatar, they can redirect the flow of testing to something else.

Figure 3:
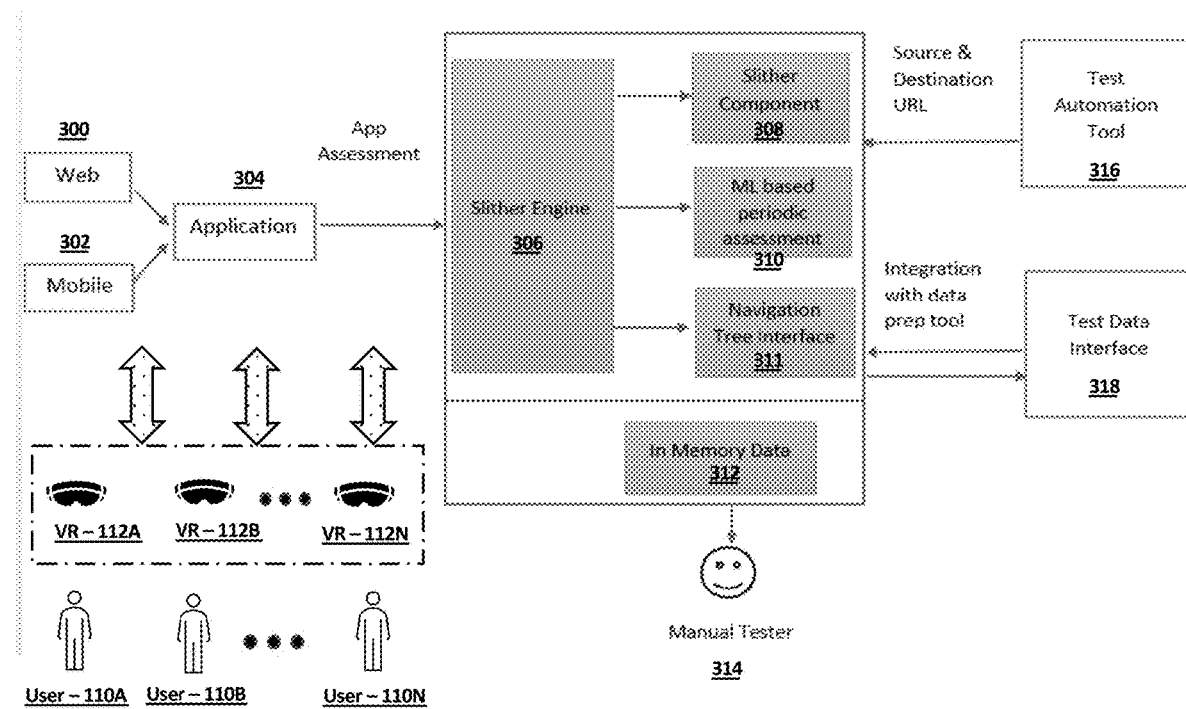
FIG. 3 is a sample high-level overview of an exemplary system architecture in which various aspects of this disclosure can be implemented.

FIG. 3 is a sample high-level overview of an exemplary system architecture in which various aspects of this disclosure can be implemented.

A web interface, application, or web site 300 or a mobile device 302 implementation thereof can work in conjunction with an application 304 or test software to be evaluated, tested, etc. The test software 304 can be fed into the slither engine 306, which implements various aspects of the disclosure. The slither engine (or engine) 306 can include a slither component 308, artificial intelligence or machine learning periodic assessment component 310, and a navigational tree or parent/child relationship module or model 311. Users 110A, 110B . . . 110N using their respective VR gear VR112A, VR112B . . . VR 112N can access the slither engine 306 execution and testing of the test software 304.

Artificial intelligence or machine learning periodic assessment 310 is relevant because some URLs or navigational parts or points can change after a certain period of time (e.g., 5 minutes, one day, one week, ten days, one month, etc.). The engine 306 can take note of this and make adjustments to the analysis of the test software as appropriate. Based upon a test software's nature, navigational points can change. The machine learning component (or other artificial intelligence) is responsible for recursively going back to the application, identifying all the navigational points and seeing if any navigational points have changed in the navigational tree. The navigational tree can then be updated as appropriate. The navigational tree interface 311 is an interface which is creating that navigational tree and constantly updating it based on the engine's analysis of the test software.

The test automation tool 316 can be any tool like Tosca, Selenium, or any other automated software-testing tool. The tool 316 can provide the source and destination URLs or application points to start and end the testing. Alternatively, any of the users could provide this information as well, or it could be looked up or retrieved from memory by the engine itself. Thus, the engine 306 can integrate with third-party testing tools or test data interfaces if desired, but it is not necessary.

The "in memory data" 312 can hold avatar information, navigational tree information, test data information, and/or any other data that is relevant to and/or supposed to be known by the slither engine or which it might need in the future. Any or all of this could be stored in this memory, which could be internal or external to the engine itself. And it can be directly accessed by a manual tester 314 if desired.

Figure 4:
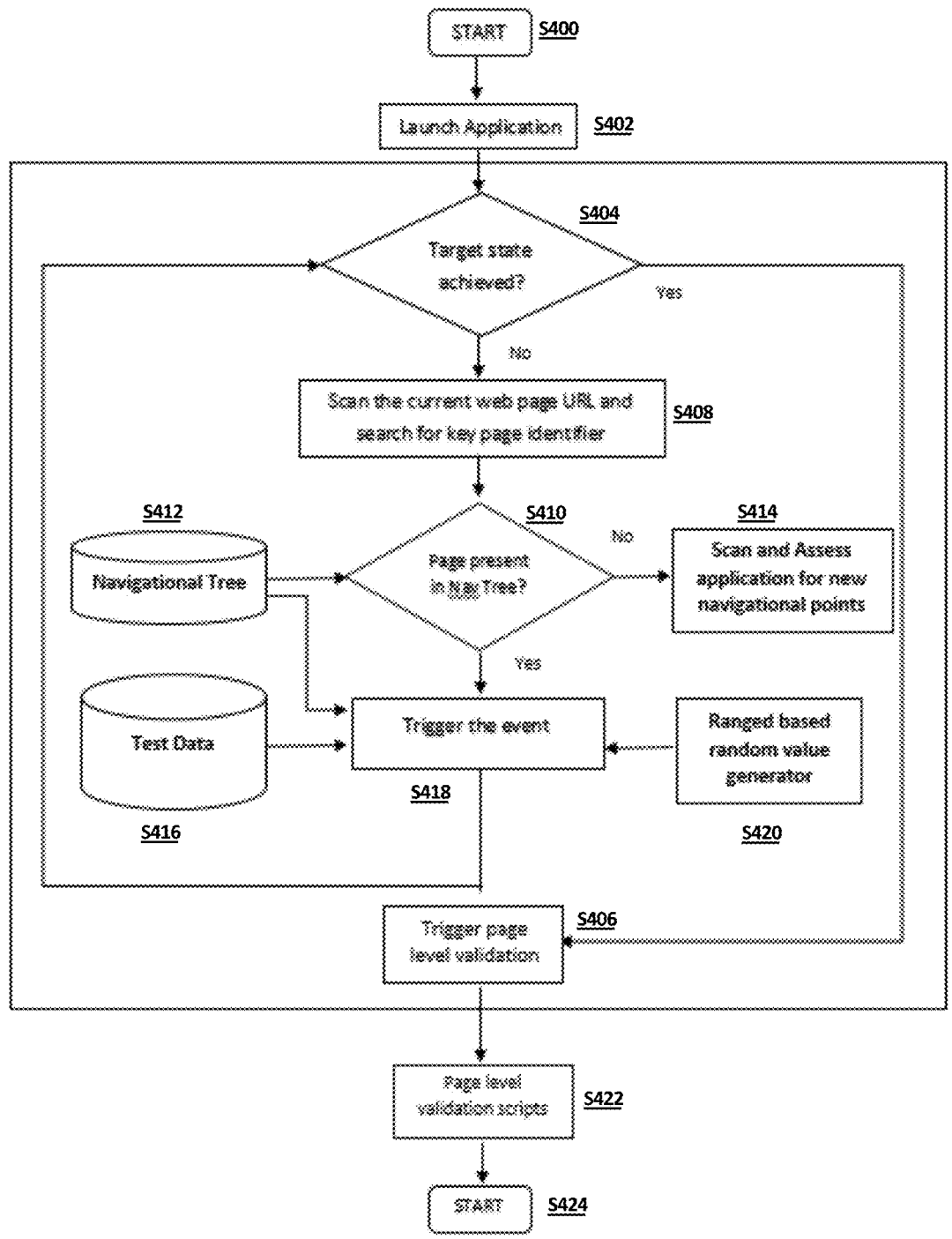
FIG. 4 is a sample high-level overview and flow diagram in which various aspects of this disclosure can be implemented.

By way of non-limited reference and explanation, a generic, sample, high-level implementation of an artificial intelligence, machine-learning, and/or the like flow diagram is depicted in FIG. 4 to show how to implement one or more aspects of this disclosure.

The process is initiated in S400. The metaverse is commenced and/or entered by the users using VR gear. The slither engine (or other engine) is initialized and the test software is launched S402. Start and end identifiers are input. In S404, the engine determines if the leaf (or last navigable link or application point) has been reached. If so the page level validation can be triggered S406, page level validation scripts S422 are executed, and the process is ready to be initiated again S424.

If the end target state has not been achieved in S404, the current web page URL and/or key page identifier in the test software can be identified by scanning S408 information contained in the testing instance. A determination is then made is S410 as to whether the current page has already been identified. If not, then the page is scanned and assessed for new navigational points in S414. In S412, new information or updated information that was identified can be stored or merged into the then-existing the current navigational tree and/or parent-client relationship structure. If the current page has already been identified in S410, the next event on the page can be triggered in S418. Test data can be retrieved from memory, manually entered, or input from the test data interface in S416. If randomized or random test data is required, a ranged based random value generator can provide the input in S420. After triggering, the process can recursively repeat by returning to S404 until all links have been traversed, all navigational data points have been identified, and the applicable results from the test software have been merged into the navigational tree or the like.

Figure 5:
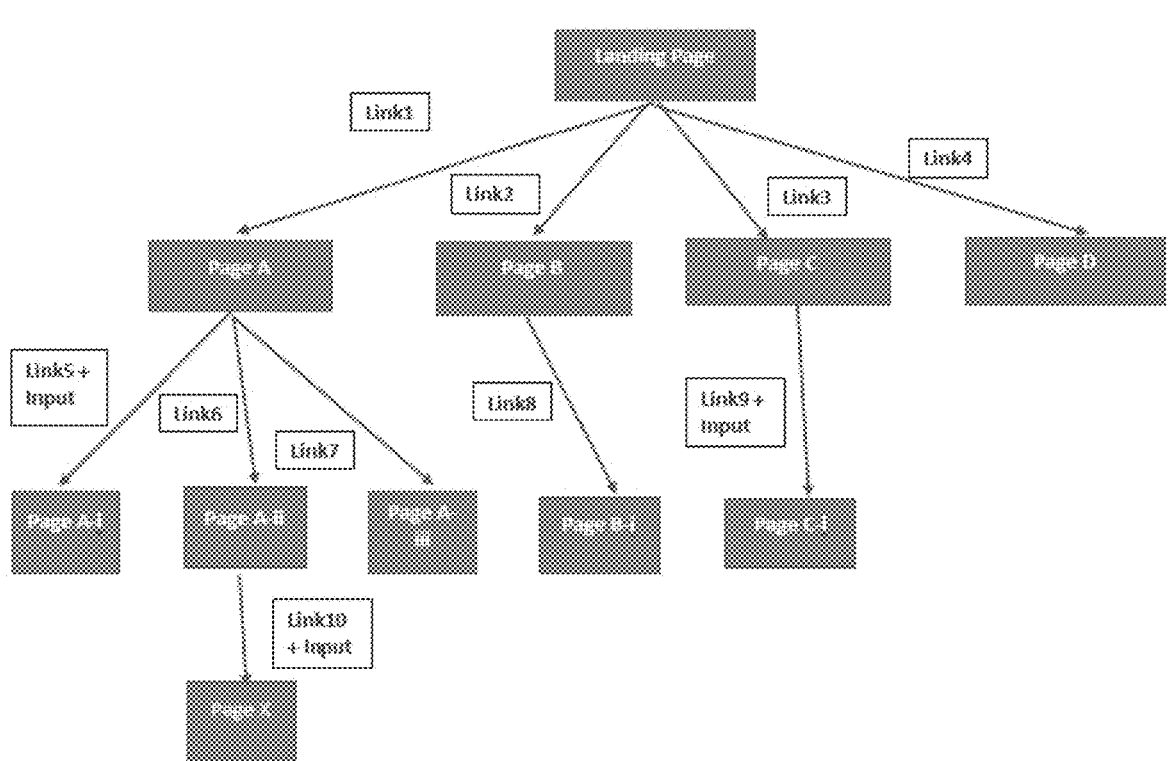
FIG. 5 is another high-level overview of an exemplary, interactive, navigational tree with links, and pages, that identifies parent and child relationships in which various aspects of this disclosure can be implemented.

FIG. 5 is a sample high-level overview of an exemplary, interactive, navigational tree 500 with links, and pages, that identifies parent and child relationships in which various aspects of this disclosure can be implemented. In essence, the recursive processes of FIGS. 4, 6, and 7 can be used to identify all pages, links, relationships, and navigational points. For example, a start point of the landing page can be used as the first point. The last leaf in the tree can be Page X. The slither engine can recursively and with artificial intelligence start at the landing page, identify all links and navigation points, provide that information to a navigational tree, select the first link, and follow it down the tree. On each successive page, each additional link can be identified. The recursive process can be repeated until all navigational points and links have been identified and traversed, after each step the new navigational information can be stored or merged into the navigational tree. The slither engine process can proceed until all pages and subpages have been identified (e.g., Page A, Page B, Page C, Page D, Page A-i, Page A-ii, Page A-iii, Page B-i, Page C-i, and Page X) along with each link and/or link plus input is traversed and/or for which information is input (e.g., Link1, Link2, Link3, Link 4, Link5+input, Link6, Link7, Link8, Link9+input, and Link10+input), thereby generating and/or updating navigational tree and/or parent-client relationship information.

Figure 6:
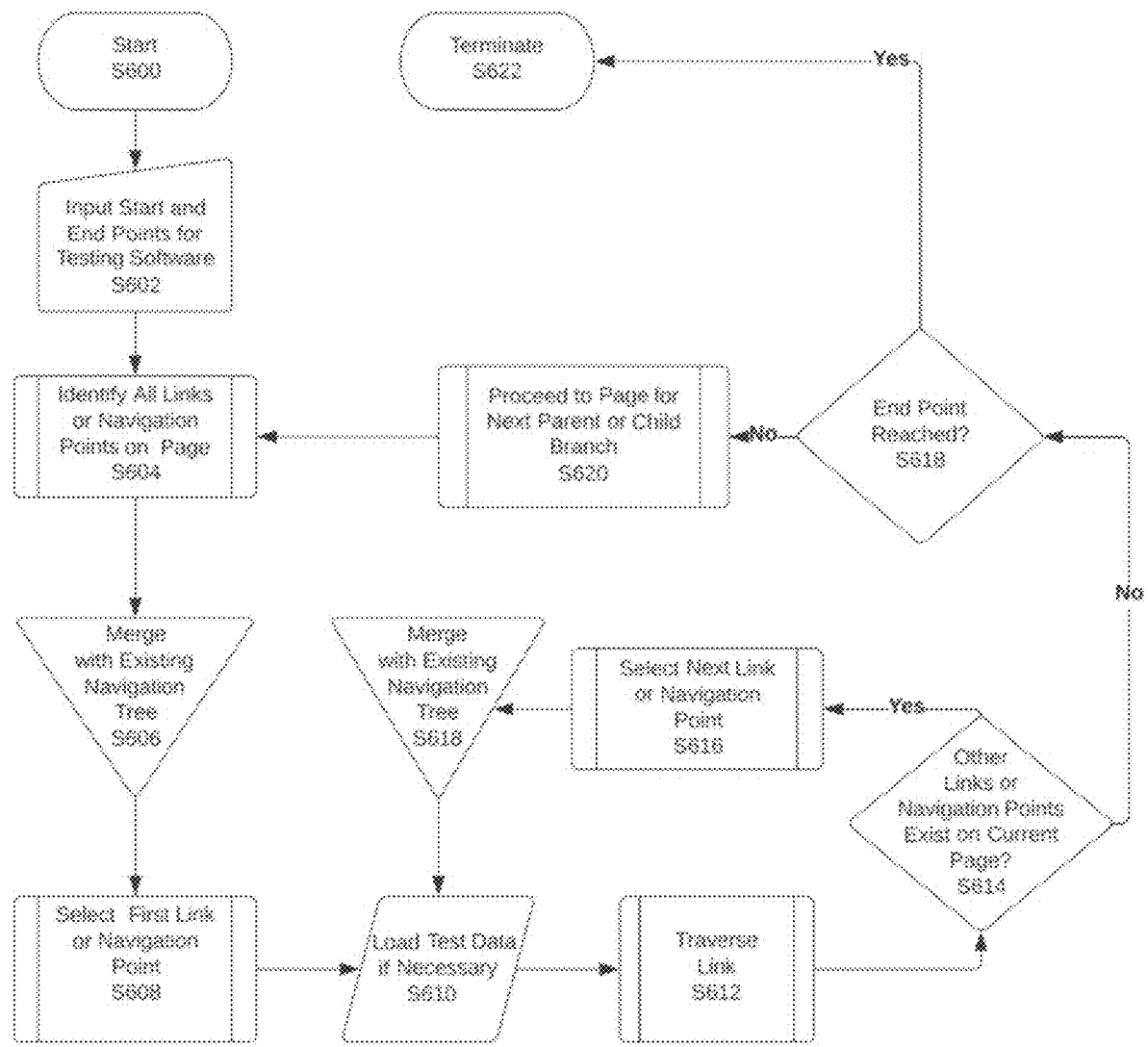
FIG. 6 is further sample high-level overview and flow diagram in which various aspects of this disclosure can be implemented.

By way of non-limited reference and explanation, another generic, sample, high-level implementation of an artificial intelligence, machine-learning, and/or the like flow diagram is depicted in FIG. 6 to show how to implement one or more aspects of this disclosure. After commencement of the test software, metaverse, setup, and slither engine in S600, start and end points for the test software can be inputted, retrieved from memory, or provided by a third-party test tool in S602. All links or navigational points on the current page can be identified on S604. New information may be merged into an existing navigational tree or the like, or, if a tree does not yet exist, one can be created in S606. The first link or navigation point can be triggered in S608. If inputs or test data needs to be loaded, this can take place in S610. The link can be traversed in S612. If other links or navigational points exist on the current page in S614, the next link or navigation point can be selected in S616, and the subsequent merge and test data loading can occur in S610 in a recursive fashion. Similarly, if there are no other links or navigation points on the current page in S614, a determination can be made if the last leaf of the tree has been reached in S618 and, if so, the process can terminate. Otherwise, the overall process may proceed to the page for the next parent or child branch in S620 and the process may repeat again starting with S604. The bottom line is the recursive processing identifies all links and navigational points, follows each to its final destination, provides test data when needed, and otherwise performs a complete and full evaluation of the test software.

Figure 7:
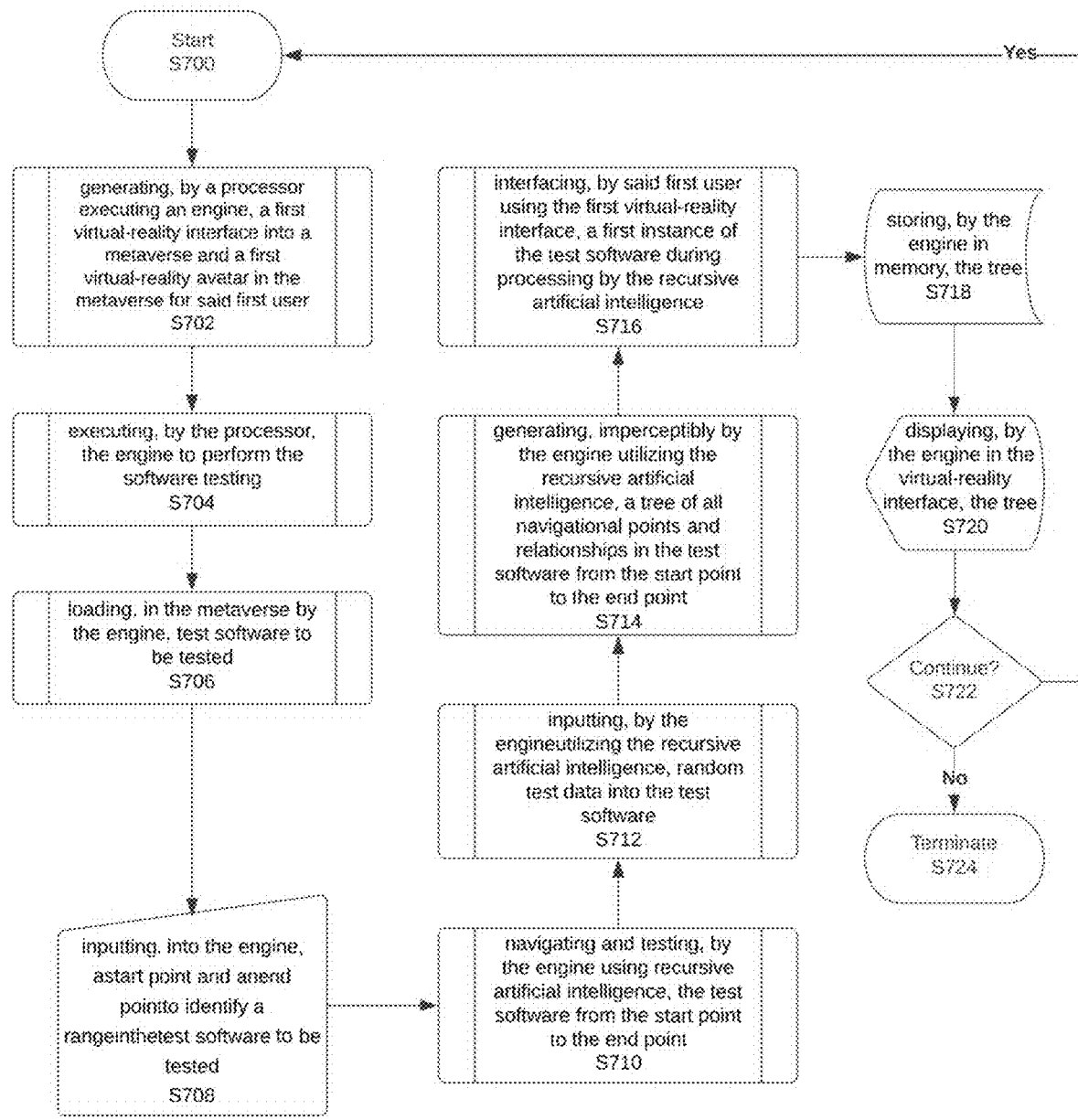
FIG. 7 is yet another sample high-level overview and flow diagram in which various aspects of this disclosure can be implemented.

Last, by way of non-limited reference and explanation, another generic, sample, high-level implementation of an artificial intelligence, machine-learning, and/or the like flow diagram is depicted in FIG. 7 to show how to implement one or more aspects of this disclosure.

As shown, a virtual-reality process is provided for one (or more users) to perform software testing by—after commencement in S700—generating, by a processor executing an engine, virtual-reality interface(s) into a metaverse and virtual-reality avatar(s) in the metaverse for user(s) in S702; executing, by the processor, the engine to perform the software testing in S704; loading, in the metaverse by the engine, test software to be tested in S706; inputting, into the engine, a start point and an end point to identify a range in the test software to be tested in S708; navigating and testing, by the engine using recursive artificial intelligence, the test software from the start point to the end point in S710; inputting, by the engine utilizing the recursive artificial intelligence, random test data into the test software in S712; generating, imperceptibly by the engine utilizing the recursive artificial intelligence, a tree of all navigational points and relationships in the test software from the start point to the end point in S714; interfacing, by the user(s) using the virtual-reality interface(s), instance(s) of the test software during processing by the recursive artificial intelligence in S716; storing, by the engine in memory, the tree in S718; and displaying, by the engine in virtual-reality interface(s), the tree in S720. If desired in S722, the process may be repeated in whole or in part, or otherwise may be terminated in S724.

The recursive artificial intelligence can be selected from the group consisting of: Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, Hierarchical Clustering, supervised machine learning, semi-supervised machine learning, unsupervised machine learning, and/or natural language processing.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A virtual-reality process for a first user to perform software testing comprising the steps of:
 (a) generating, by a processor executing an engine, a first virtual-reality interface into a metaverse and a first virtual-reality avatar in the metaverse for said first user;
 (b) executing, by the processor, the engine to perform the software testing;
 (c) loading, in the metaverse by the engine, test software to be tested;
 (d) inputting, into the engine, a start point and an end point to identify a range in the test software to be tested;
 (e) navigating and testing, by the engine using recursive artificial intelligence, the test software from the start point to the end point;

(f) inputting, by the engine utilizing the recursive artificial intelligence, random test data into the test software;

(g) generating, imperceptibly by the engine utilizing the recursive artificial intelligence, a tree of all navigational points and relationships in the test software from the start point to the end point;

(h) interfacing, by said first user using the first virtual-reality interface, a first instance of the test software during processing by the recursive artificial intelligence;

(i) storing, by the engine in memory, the tree; and (j) displaying, by the engine in the virtual-reality interface, the tree.

2. The virtual-reality process of claim 1 wherein a second user simultaneously performs the software testing in the metaverse, said second user having a second virtual-reality interface and a second virtual-reality avatar, and further comprising the step of interfacing, by said second user using the second virtual-reality interface, a second instance of the test software during processing by the recursive artificial intelligence.

3. The virtual-reality process of claim 2 wherein the interfacing allows monitoring of the recursive artificial intelligence by the first user and the second user through the first virtual-reality interface and the second virtual-reality interface.

4. The virtual-reality process of claim 3 wherein the interfacing allows control of the recursive artificial intelligence by the first user and the second user through the first virtual-reality interface and the second virtual-reality interface.

5. The virtual-reality process of claim 4 wherein the start point and the end point are input manually by the first user.

6. The virtual-reality process of claim 5 wherein said recursive artificial intelligence is selected from the group consisting of: Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, and Hierarchical Clustering.

7. The virtual-reality process of claim 6 wherein said recursive artificial intelligence include machine learning.

8. The virtual-reality process of claim 7 wherein said machine learning is selected from the group of: supervised machine learning, semi-supervised machine learning, unsupervised machine learning, and natural language processing.

9. The virtual-reality process of claim 8 wherein said machine learning performs a periodic assessment of whether to update the tree.

10. The virtual-reality process of claim 9 wherein the tree identifies all parent-child relationships in the test software and all links from parent to child pages.

11. The virtual-reality process of claim 10 in which the steps are implemented as computer-executable instructions stored on computer-readable media that are executed by the processor.

12. The virtual-reality process of claim 4 wherein the start point and the end point are input automatically by the engine from a test automation tool.

13. The virtual-reality process of claim 12 wherein said recursive artificial intelligence is selected from the group consisting of: Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, and Hierarchical Clustering.

14. The virtual-reality process of claim 13 wherein said recursive artificial intelligence include machine learning.

15. The virtual-reality process of claim 14 wherein said machine learning is selected from the group of: supervised machine learning, semi-supervised machine learning, unsupervised machine learning, and natural language processing.

16. The virtual-reality process of claim 15 wherein said machine learning performs a periodic assessment of whether to update the tree.

17. The virtual-reality process of claim 16 wherein the tree identifies all parent-child relationships in the test software and all links from parent to child pages.

18. The virtual-reality process of claim 17 in which the steps are implemented as computer-executable instructions stored on computer-readable media that are executed by the processor.

19. A virtual-reality process for a plurality of users to perform software testing without manual intervention comprising the steps of:

(a) generating, by a processor executing an engine, virtual-reality interfaces into a metaverse and virtual-reality avatars in the metaverse for said plurality of users;

(b) executing, by the processor, the engine to perform the software testing;

(c) loading, in the metaverse by the engine, test software to be tested;

(d) inputting, into the engine, a start point and an end point to identify a range in the test software to be tested;

(e) navigating and testing, by the engine using recursive artificial intelligence, the test software from the start point to the end point;

(f) inputting, by the engine utilizing the recursive artificial intelligence, random test data into the test software from a test data interface or a test automation tool;

(g) generating, imperceptibly by the engine utilizing the recursive artificial intelligence, a tree of all navigational points and relationships in the test software from the start point to the end point;

(h) assessing, periodically by the recursive artificial intelligence, whether the tree needs to be updated;

(i) interfacing, by said plurality of users using virtual-reality interfaces, instances of the test software during processing by the recursive artificial intelligence;

(j) storing, by the engine in memory, the tree; and (k) displaying, by the engine in the virtual-reality interfaces, the tree.

20. A virtual-reality process for a plurality of users to perform software testing without manual intervention comprising the steps of:

(a) generating, by a processor executing an engine, virtual-reality interfaces into a metaverse and virtual-reality avatars in the metaverse for said plurality of users;

(b) executing, by the processor, the engine to perform the software testing;

(c) loading, in the metaverse by the engine, test software to be tested;

(d) inputting, into the engine, a start point and an end point to identify a range in the test software to be tested;

(e) navigating and testing, by the engine using recursive artificial intelligence, the test software from the start point to the end point, said recursive artificial intelligence selected from the group consisting of: Naive Bayes, Decision Tree, Random Forest, Support Vector Machines, K Nearest Neighbors, Linear Regression, Lasso Regression, Logistic Regression, Multivariate Regression, Multiple Regression, K-Means Clustering, Fuzzy C-mean, Expectation-Maximisation, Hierarchical Clustering, supervised machine learning, semi-supervised machine learning, unsupervised machine learning, and natural language processing;

(f) inputting, by the engine utilizing the recursive artificial intelligence, random test data into the test software from a test data interface or a test automation tool;

(g) generating, imperceptibly by the engine utilizing the recursive artificial intelligence, a tree of all navigational points and relationships in the test software from the start point to the end point;

(h) assessing, periodically by the recursive artificial intelligence, whether the tree needs to be updated;

(i) interfacing, by said plurality of users using virtual-reality interfaces, instances of the test software during processing by the recursive artificial intelligence;

(j) storing, by the engine in memory, the tree; and (k) displaying, by the engine in the virtual-reality interfaces, the tree.

\* \* \* \* \*